Nov. 13, 1962 F. C. THOMPSON 3,064,204

BROAD-BAND AMPLIFIER

Filed Jan. 28, 1959 2 Sheets-Sheet 1

INVENTOR
FRED C. THOMPSON

BY
Mitchell & Bechert
ATTORNEYS

INVENTOR
FRED C. THOMPSON

BY Mitchell & Bechert

ATTORNEYS

United States Patent Office 3,064,204

Patented Nov. 13, 1962

3,064,204
BROAD-BAND AMPLIFIER

Fred C. Thompson, State College, Pa., assignor, by mesne assignments, to HRB-Singer, Inc., State College, Pa., a corporation of Delaware Filed Jan. 23, 1959, Ser. No. 789,618
1 Claim. (Cl. 330—54)

This invention relates to a broad-band amplifier, and more particularly to a unique, distributed band pass amplifier comprising one or more cascaded sections.

In recent years, considerable money and effort have been expended by the communications industry in the search for a practical amplifier having a band width covering the entire very-high-frequency spectrum. The difficulties encountered in striving for increasingly wider-bandwidth-amplifiers through conventional techniques of cascading stages are well known. As a result of this research, it is now recognized that a maximum gain band width factor exists for a given tube, regardless of the complexity of the interstage coupling network.

Band width limitation has been overcome to some extent by distributed amplification techniques. For a detailed analysis of the principles of distributed amplification, reference may be had to the Proceedings of the IRE, August 1948.

Generally, a distributed amplifier comprises a pair of transmission line circuits, respectively in the grid and plate lines of a plurality of amplifier tubes. The transmission lines are designed to have identical velocities of propagation, so that an input applied to the grids of each of the tubes produces a co-phasal output. The output voltage of such an amplifier is, therefore, directly proportional to the number of tubes and may be increased to any desired limit. Although the conventional distributed amplifier, to some extent, has solved the problem of band width limitation, it has the disadvantage of extremely poor amplitude response and a relatively poor noise figure.

Accordingly, it is a primary object of this invention to preserve the band width advantages of the distributed amplifier, and to combine with the amplifier an active input network having amplitude response and low noise characteristics which complements the corresponding characteristics of the distributed amplifier.

It is a feature of the invention to provide such an input network which presents a better match to the signal source than does the conventional distributed amplifier.

It is a further feature of the invention to provide cascaded stages of the modified distributed amplifiers to obtain gain-band width capabilities which heretofore could not be obtained practically by using the conventional distributed techniques.

In accordance with an aspect of the invention, there is provided a distributed band pass amplifier including an active input network, comprising a conventionally coupled, cascade pair of grounded grid triodes, or more generally an active input network comprising a conventionally coupled amplifier stage, or stages, which is optimally coupled to the distributed amplifier.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
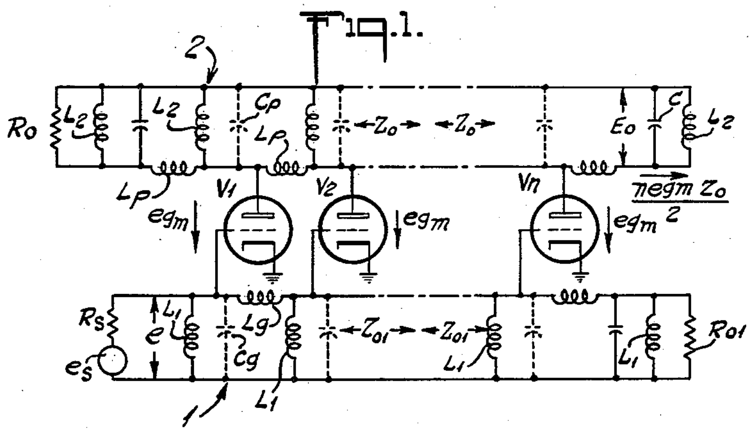
FIGURE 1 is a schematic diagram of a basic distributed band pass amplifier.

The basic distributed band pass amplifier, illustrated in FIGURE 1, comprises a plurality of electronic amplifier devices, such as vacuum tubes V1, V2 - - - V$n$, and two identical transmission lines 1, 2 in the grid and plate circuits, respectively. The grid transmission line includes grid-to-cathode capacitances $C_g$, shown by dotted line, coils L1 connected across the line and coils $L_g$ connected between the tubes. The plate line includes the plate-to-cathode capacitances $C_p$, and coils L2 and $L_p$; the coils L2 being connected across the line and coils $L_p$ between the tubes.

The grid line 1 is terminated with an impedance $R_{01}$ equal to the characteristic impedance $Z_{01}$ of the line. The input signal is applied to the grid line by a signal generator $e_s$ having an impedance $R_s$. Since the grid line is terminated properly, the generator impedance is independent of the number of tubes. Similarly, the plate line is terminated with an impedance $R_0$ equal to the characteristic impedance $Z_0$ of the transmission line. The transmission lines comprise other conventional components for matching and filtering purposes, well known to those experienced in the art.

The generator $e_s$ causes a wave to travel along the grid line. As the wave arrives at the grids of the tubes V1–V$n$, currents $eg_m$ flow in the plates of the tubes. Each tube then sends waves in the plate line in both directions. The waves which travel to the left in the plate line are absorbed and do not contribute to the output signal. The two transmission lines 1, 2 are formed so as to have identical velocities of propagation, so that the waves which travel to the right in the plate line add in phase. Thus, the output voltage is directly proportional to the number of tubes and is equal to $$\frac{neg_mZ_0}{2}$$

If desired, two or more stages of distributed amplifiers may be cascaded. However, there is an optimum gain for cascaded stages which must be determined empirically, because theoretical derivations generally ignore the reduction in band width associated with cascading stages.

Figure 4:
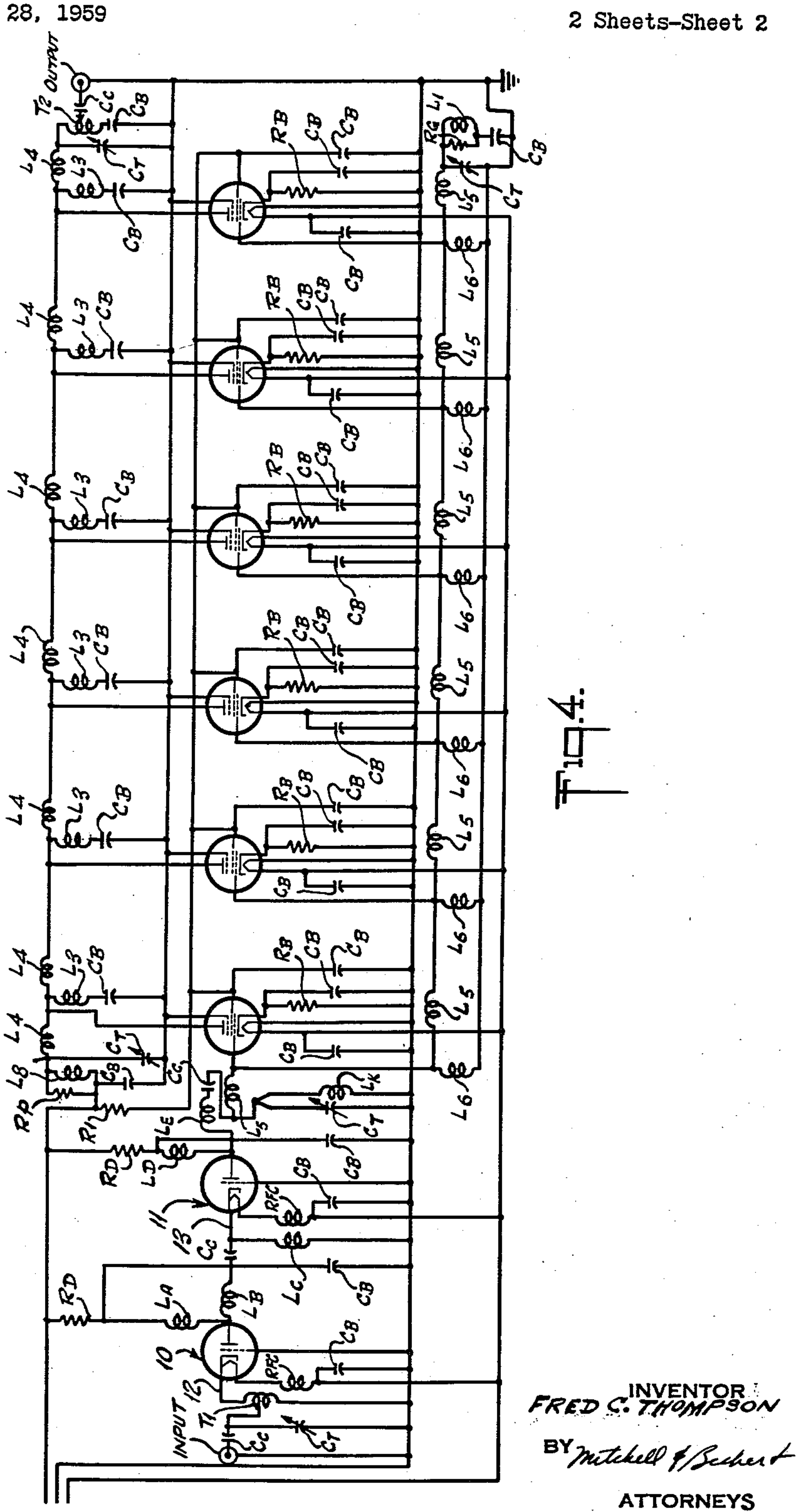
FIGURE 4 is a schematic diagram of the combined distributed amplifier and active input network.

The grid and plate transmission lines comprise filter sections which are, of course, designed to satisfy specific requirements. One preferred type of filter section, with respect to circuit convenience, is a basic three-element, upper peaked, half section. This type of filter section contributes to the extended wide band performance of the amplifier by compensating the high-frequency drop-off inherent in the vacuum tube. Referring briefly to FIGURE 4, the plate filter half sections comprise coils L3, L4 and the grid filter half sections comprise coils L5 and L6.

In order to better understand the advantages of the invention, it will be helpful to review the frequency vs. gain characteristic of the distributed amplifier.

The voltage gain of an $n$ section distributed amplifier is $$A_0=\frac{E_0}{e}=\frac{neg_m\frac{Z_0}{2}}{e}=ng_m\frac{Z_0}{2} \quad (1)$$

The overall gain for an amplifier having $m$ identical cascaded stages is $$A^m=\left[ng_m\frac{Z_0}{2}\sqrt{\frac{Z_g}{Z_0}}\right]^m \quad (2)$$

where $$\sqrt{\frac{Z_g}{Z_0}}$$

is the transformation required to match the plate line impedance, $Z_0$, of one stage to the grid line impedance $Z_g$ of the succeeding stage. Equation 2 can also be expressed in terms of fundamental design parameters of band width, $f_2-f_1$, and the interelectrode capacitances $C_p$ and $C_g$. Midband frequency, $f_0=\sqrt{f_1f_2}$, and the midband gain can be expressed by $$A_0^m\left[ng_m\frac{\sqrt{R_0R_{01}}}{2}\right]^m \quad (3)$$

where $R_{01}$ is the nominal grid line terminating impedance which is equal to $$\frac{2}{C_g\cdot 2\pi(f_2-f_1)}$$

and $R_0$ is the nominal plate line terminating impedance which is equal to $$\frac{2}{C_p\cdot 2\pi(f_2-f_1)}$$

Figure 2:
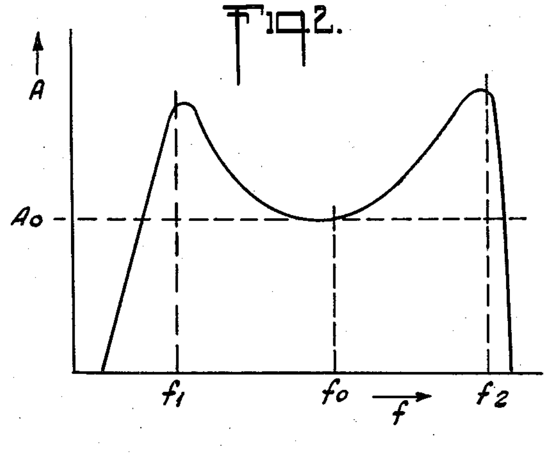
FIGURE 2 is a gain vs. frequency characteristic of a lossless distributed band pass amplifier.

The irregular gain band width characteristic of a lossless distributed amplifier is illustrated in FIGURE 2.

Figure 3:
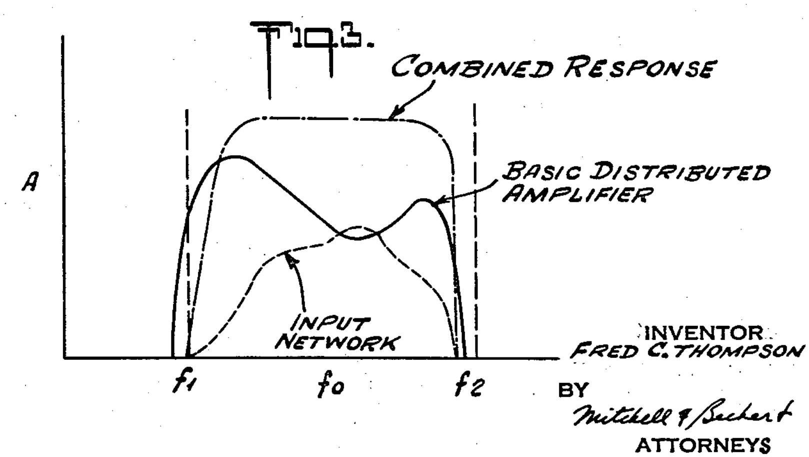
FIGURE 3 are curves of a distributed band pass amplifier characteristic, an active input network characteristic and the combined characteristic.

Since the amplifier is intended for use in the VHF spectrum, the effects of such high frequency must be considered. In general, the only source of significant attenuation in the distributed amplifier, even at frequencies exceeding 100 mc., is that due to grid loading. This attenuation takes the form of a shunt conductance across the input terminals of each amplifier tube. This conductance is caused by the transit time required for the electrons to travel from the cathode to the anode and the degenerative effect of the cathode lead inductance. The relative loading of these two effects is a function of the tube geometry. However, in the VHF region, both effects can be represented by a grid loading conductance G, which is proportional to the frequency squared. Thus, the power factor of the inductive elements can be ignored and the power factor of the grid line shunting capacitance can be considered to be $$\delta_c=\frac{G}{\omega C_g}=\frac{K\omega^2}{\omega C_g}$$

where K is a function of amplifier tube geometry and $\omega$ is equal to $2\pi f$. The aforementioned article in the Proceedings of the IRE shows that the gain of a distributed amplifier with grid losses can be related to the gain of an identical lossless amplifier by $$\frac{A_{(\text{LOSS})}}{A_{(\text{LOSSLESS})}}=\left[1-\frac{n}{4}K\omega^2\frac{db}{d\omega}\right]$$

where $$\frac{db}{d\omega}$$

is the phase slope characteristic of the band pass or filter section. Because of this band width reduction, the designed band width of the conventional distributed amplifier must be somewhat larger than the desired band width. It is clear from FIGURE 3 that the amplitude response of the distributed amplifier is highly irregular and, therefore, undesirable for broad-band applications.

The sources of noise to be considered in a distributed amplifier which extends to high frequencies are thermal noise in the input impedance and in the grid line and plate line terminating impedance; shot noise and partition noise generated in the electron tube; induced grid noise due to transit time effects at high frequencies, and thermal noise in the equivalent grid loading impedance developed between the grid and cathode of the electron tube as a result of cathode lead inductance and grid to cathode capacitance.

Theoretically, the noise figure of a distributed amplifier can be no better than the optimum value for a conventional cascade amplifier employing the same tube type.

In actual practice, however, the noise figure of a distributed amplifier has been found to be much worse than this optimum value. Since the conventional amplifier preferably employs pentode vacuum tubes and an input network which has not been designed for an optimum low noise source conductance, the distributed amplifier has not appeared to be practical for applications requiring maximum sensitivity.

In accordance with the present invention, the undesirable characteristics of the distributed amplifier are compensated or overcome by an active input network having characteristics shown by dashed lines in FIGURE 1. The unique combination of the active input network connected to the distributed amplifier provides a combined response which includes the advantages of both circuits and the disadvantages of neither. The combined response is shown by dot-and-dash lines, in FIGURE 3.

Referring now to FIGURE 4, the input network preferably comprises a cascade pair of grounded grid amplifier stages 10 and 11. The input signal is applied to the terminal marked "input" and fed over an auto transformer T1 to the cathode 12 of amplifier 10. Other input circuit configurations may be employed, such as pentodes, grounded cathode amplifier stages, paralleled amplifiers, cascade stages and others.

The amplifier stages of the grounded grid type have the advantage of better isolation between the tube anode and cathode element, and lower grid lead inductance. In addition, broad-band interstage coupling to a high transconductance tube in a grounded grid configuration is relatively easy to accomplish in the VHF band.

The capacitors $C_c$ and $C_t$ are coupling and trimmer capacitors, respectively. The coils RFC connected in the respective cathode circuits are choke coils, and the capacitors $C_B$ are bypass capacitors for the unwanted frequencies. Resistors $R_D$ in the plate circuits of the respective stages 10, 11 are dropping resistors.

The amplified signal from stage 10 is applied over coil $L_B$, capacitor $C_c$ to cathode 13 of stage 11.

More generally, $L_A$, $L_B$ and $L_c$ are the $\pi$ section equivalent to a mutually coupled transformer which provides an optimum impedance match from the output of the preceding stage to the input of the following stage.

The output from the amplifier 11 is applied to the grid transmission line over coils $L_E$, L5 and coupling capacitor $C_c$. The coils $L_D$, $L_E$ and $L_K$ serve the same purpose as coils $L_A$, $L_B$ and $L_c$, respectively. The coils L5 and L6 constitute the half section filters in the grid line, as previously explained. The grid line is terminated in a resistor $R_g$, shunted by a coil $L_g$. The currents generated by each of the tubes in the distributed amplifier are transmitted over the plate line to an output transformer T2, from which an output is derived at the terminal marked "output." The plate line is terminated in a resistor $R_p$, shunted by a coil L8.

An advantage of this input network to the distributed amplifier is that the distributed amplifier grid line is fed from a high source resistance as compared to the conventional coaxial line impedance. Thus, the noise factor of the third stage, i.e., the distributed stage, is reduced appreciably, and the noise contribution of the third state can be neglected. Experiments have shown that the noise figure of the input network is practically independent of frequency up to 300 mc. A useful application of the inventive amplifier is for radio frequency preamplification to improve the sensitivity of the crystal video detector.

Thus, a specific and preferred embodiment of the inventive combination comprises a distributed amplifier in combination with a cascaded grounded grid amplifier. The combination contains all of the advantages of the individual amplifiers and eliminates the disadvantages of both. The input network amplitude response characteristic complements the distributed band pass circuit response characteristic to give a combined, very flat amplitude response over the entire frequency range. The band width of the novel amplifier is in excess of three octaves and units have been constructed having an upper frequency range in excess of 500 mc.

While the foregoing description sets forth the principles of the invention in connection with specific apparatus, it is to be clearly understood that this description is made only by way of example and not as a limitation of the scope of the invention as set forth in the objects thereof and in the accompanying claim.

The claim:

A band pass amplifier comprising a distributed amplifier stage having an irregular amplitude response characteristic, said distributed amplifier comprising a plurality of vacuum tubes connected in parallel, each of said vacuum tubes having cathode, grid and plate electrodes, a first transmission line connecting the respective grids of said tubes and including band pass filter sections between said tubes, the grid-to-cathode capacitance constituting a filtering component, a second transmission line connecting the respective plates of said tubes and also comprising frequency filtering components between said tubes including plate-to-cathode capacitance, the transmission lines being terminated with an impedance equal to the characteristic impedances of the respective lines whereby reflections are eliminated, an active input network comprising a cascaded pair of grounded grid amplifiers connected to the input of said first transmission line, means for applying an input signal to the cathode of the first amplifier of said pair, and means for deriving an output from said second transmission line.

References Cited in the file of this patent

UNITED STATES PATENTS

| | | |
|---|---|---|
| 2,670,408 | Kelley | Feb. 23, 1954 |
| 2,727,100 | Hurvitz | Dec. 13, 1955 |
| 2,745,004 | Yeo Pay Yu | May 8, 1956 |
| 2,761,022 | Tongue et al. | Aug. 28, 1956 |
| 2,863,006 | Diambra et al. | Dec. 2, 1958 |
| 2,934,710 | Percival | Apr. 26, 1960 |
| 2,960,664 | Brodwin | Nov. 15, 1960 |

FOREIGN PATENTS

| | | |
|---|---|---|
| 460,562 | Great Britain | Jan. 25, 1937 |
| 902,505 | Germany | Jan. 25, 1954 |

OTHER REFERENCES

Publication, Electronic Engineering, May 1952, pages 214–219. "Millimicrosecond Pulse Techniques," by Moody et al.